(12) United States Patent
Johansen

(10) Patent No.: US 6,576,204 B2
(45) Date of Patent: Jun. 10, 2003

(54) PROCESS FOR THE PRODUCTION OF ALUMINA

(75) Inventor: Keld Johansen, Frederikssund (DK)

(73) Assignee: Haldor Topsoe A/S, Lyngby (DK)

( * ) Notice: Subject to any disclaimer, the term of this patent is extended or adjusted under 35 U.S.C. 154(b) by 49 days.

(21) Appl. No.: 09/773,561

(22) Filed: Feb. 2, 2001

(65) Prior Publication Data

US 2001/0046469 A1 Nov. 29, 2001

Related U.S. Application Data

(60) Provisional application No. 60/180,164, filed on Feb. 4, 2000.

(51) Int. Cl.$^7$ .................................................. C01F 7/00
(52) U.S. Cl. ....................................... 423/132; 423/626
(58) Field of Search ............................... 423/132, 626, 423/393, 394.2

(56) References Cited

U.S. PATENT DOCUMENTS

| | | | | |
|---|---|---|---|---|
| 1,354,824 A | * | 10/1920 | Goldschmidt | 423/626 |
| 3,647,373 A | * | 3/1972 | Huska et al. | 423/626 |
| 4,044,115 A | * | 8/1977 | Eisele et al. | 423/132 |
| 4,246,239 A | * | 1/1981 | Dewey et al. | 423/132 |
| 4,260,589 A | * | 4/1981 | Eichbaum et al. | 423/132 |
| H189 H | * | 1/1987 | Bauer | 423/111 |

* cited by examiner

*Primary Examiner*—Steven Bos
(74) *Attorney, Agent, or Firm*—Dickstein Shapiro Morin & Oshinsky, LLP

(57) ABSTRACT

A process for the production of alumina is performed by dissolving gibbsite $Al_2O_3 \cdot 3H_2O$ in nitric acid to provide an acid solution containing aluminum nitrate; decomposing the acid solution at 300–700° C. with a free air supply to form alumina and $No_x$ by spraying onto the inner surface of one or more rotary kilns, drying in a fluid bed, or drying in a steel belt conveyor furnace; regenerating the formed $NO_x$ into concentrated nitric acid and recycling the nitric acid to be used for the dissolving of gibbsite; and recovering the alumina formed upon decomposing the acid solution.

4 Claims, No Drawings

PROCESS FOR THE PRODUCTION OF ALUMINA

This application claims the benefit of U.S. Provisional Application No. 60/180,164, filed Feb. 4, 2000.

BACKGROUND OF THE INVENTION

1. Field of the Invention

The present invention relates to a process for the production of aluminum hydroxide containing material, in particular for use in the preparation of catalyst carriers.

2. Description of the Related Art

The state of the art methods for preparing alumina include use of raw materials produced by precipitation as exemplified by mixing bases such as alkaline aluminate and alkaline hydroxide bases with an acid such as $HNO_3$, $H_2SO_4$ and $H_3PO_4$, in addition to $Al(NO_3)$ and $Al_2(SO_4)_3$. Useful carriers for refinery processing catalysts are produced from alumina and intermediate products like pseudo boehmite owing to their large surface area and high porosity.

The known methods for preparing alumina catalyst carriers are costly to purchase the acid and basic raw materials being employed in the preparation process, and also expenses to perform pH adjustments, washing steps and wastewater treatment.

The general object of this invention is, thus, to provide an improved process for the production of alumina such as aluminum oxide and pseudo boehmite for use in the preparation of catalyst carriers, wherein the production of alumina is carried out by simplified and inexpensive steps. Compared to the known methods, the advantages of the invention include high product yield through reduced loss of material during the processing.

SUMMARY OF THE INVENTION

The process of this invention comprises the following steps:

a) dissolution of gibbsite ($Al_2O_3.3H_2O$) in nitric acid to provide an acid solution of $Al(NO_3)_3$ by reaction (i):

$$Al_2O_3.3H_2O + 6HNO_3 \rightarrow 2Al(NO_3)_3 + 6H_2O;$$

b) thermal decomposition of the acid solution into aluminum hydroxides and NOx gases by reaction (ii):

$$2Al(NO_3)_3 + 6H_2O \rightarrow Al_2O_3.ZH_2O + 6NO_2 + (6-Z)H_2O + 3/2O_2;$$

and c) regeneration of NOx gases in one or a series of absorption towers to concentrated nitric acid according to reaction (iii):

$$6NO_2 + 3H_2O + 3/2O_2 \rightarrow 6HNO_3.$$

The overall reaction, i.e. (i)+(ii)+(iii), is then:

$$Al_2O_3.3H_2O + 3H_2O \rightarrow Al_2O_3.ZH_2O + (6-Z)H_2O,$$

wherein $$Z=0.5-3.$$

DETAILED DESCRIPTION OF THE PREFERRED EMBODIMENT

In a specific embodiment of the invention, $NO_2$ being formed in the above reaction (i) is partly regenerated in absorption towers. Reaction (ii) results in formation of nitric acid that is recycled and utilized for dissolution of gibbsite, which is the sole raw material in the process.

Due to minor loss of the nitric acid to be recycled, however, it may be occasionally necessary to add small amounts of nitric acid in addition to what is being currently regenerated, to maintain or enhance dissolution of the gibbsite raw material.

Decomposition in the above step (b) may be performed by spraying the acidic solution obtained in step (a) onto the inner surface of one or more rotary kilns with a free supply of air at 300–700° C. However, by using this method, measures may be taken in order to prevent sticking of the product to the inner surface of the rotary kiln, e.g. by means of one or more sliding chains. In order to be efficient, the chains must be relatively heavy and are to be present inside each kiln in such a way that they slide down on the kiln surface, while the kiln rotates, and thereby prevent the solid material from adhering to the surface.

Adhesion of the prepared material from the decomposed acid solution to the inner side of said kiln may also be prevented by other physical or chemical means known in the art.

Other methods for performing the decomposition set forth in (b) above include drying the acidic solution obtained from (a) in a fluid bed, and drying the solution in a steel band conveyor furnace.

The alumina product can be further improved by addition of an organic compound capable of reducing nitrates. Those components can be glucose or similar compounds. The reaction between the organic compound and the nitrate will then generate a faster decomposition of the nitrates through minor local explosions, and, thus, reduce the size of the formed particles.

EXAMPLE

Preparation of alumina from aluminium nitrate ($Al(NO_3)_3.9H_2O$).

225 g $Al(NO_3)_3.9H_2O$ are dissolved in 100 g water and 1 g 65% by weight $HNO_3$. The solution is clear without any remaining crystallites.

The solution is then pumped into a preheated rotating furnace (length 1.5 m inclination 1°), rotating at 30 rpm. The temperature in the furnace is 350° C.

The pumping speed is around 5–20 ml/min. Alumina in its boehmite form starts to form when the solution comes into contact with the walls of the furnace by the decomposition of the nitrates.

The formed product is in the shape of a very porous foam that can easily be grinded to a powder suitable for further processing.

What is claimed is:

1. A process for the production of alumina comprising:
   a. dissolving gibbsite in nitric acid to provide an acid solution containing aluminum nitrate;
   b. decomposing the acid solution at 350–700° C. with a free air supply to obtain alumina and a $NO_x$ by spraying the acid solution onto the inner surface of one or more rotary kilns, drying the acid solution in a fluid bed, or drying the acid solution in a steel band conveyor furnace;

c. regenerating the formed $NO_x$ to concentrated nitric acid and recycling the concentrated nitric acid to be used for dissolving gibbsite in process segment (a); and d. recovering the alumina formed upon decomposing the acid solution.

2. A process according to claim 1, wherein the decomposing of the acid solution further includes adding to the acid solution an organic compound which is active in reducing nitrates.

3. A process according to claim 1, wherein each of the one or more rotary kilns is equipped with one or more chains which slide on the inner surface of the kiln, while the kiln is rotated.

4. A process according to claim 1, wherein the alumina obtained by the decomposing of the acid solution is boehmite.

* * * * *